United States Patent Office 2,989,555
Patented June 20, 1961

2,989,555
PROCESS FOR THE PREPARATION OF ε-KETONIC ACIDS
Marten Herman Klouwen, Naarden, and Johannes G. J. Kok, Amsterdam, Netherlands, assignors to N.V. Chemische Fabriek Naarden, Naarden, Netherlands, a corporation of the Netherlands
No Drawing. Filed Mar. 2, 1959, Ser. No. 796,248
Claims priority, application Netherlands Mar. 11, 1958
17 Claims. (Cl. 260—413)

The invention relates to a process for the preparation of ε-ketonic acids.

The British patent specification No. 748,801 describes a number of methods for the preparation of ε-ketonic acids:

(a) An alkyl halide, e.g. an alkyl bromide, is condensed with the aid of e.g. magnesium with a di-ester of malonic acid, preferably the dibenzyl ester, to form the corresponding alkyl malonate. This ester is subsequently condensed with adipic anhydride and the reaction product is hydrogenated. The tricarboxylic acid thus obtained loses 2 molecules of carbon dioxide and in this way yields the ε-ketonic acid.

(b) An alkyl halide, e.g. an alkyl bromide, is condensed with cycloheptane-dion-1,3, with the aid of e.g. sodium. The 2-alkylcycloheptane-dion-1,3, thus obtained, when treated with alkali and subsequently acidified, yields the ε-ketonic acid.

(c) An alkyl magnesium halide, e.g. an alkyl magnesium bromide, is condensed with an adipic alkyl imide, e.g. adipic methyl imide. After saponification and acidification the condensation product gives the ε-ketonic acid.

(d) An alkyl magnesium halide, e.g. an alkyl magnesium bromide, is condensed with cyclohexanone. The alkyl cyclohexanol thus formed is subsequently dehydrated with e.g. acid potassium sulphate, upon which the alkyl cyclohexene thus obtained gives the ε-ketonic acid through oxidation with e.g. chromic acid.

(e) A zinc or cadmium dialkyl is condensed with an acid halide, preferably the acid chloride, of an adipic mono-ester, e.g. the methyl ester. The ε-ketonic ester thus formed is converted by saponification and acidification into the corresponding ε-ketonic acid.

(f) A 2-alkyl cyclohexanone, to be prepared by condensation of cyclohexanone with an aliphatic aldehyde, followed by dehydration and hydrogenation, is oxidized with chromic acid. From the latter a ε-ketonic acid is formed directly.

All these methods of preparation involve drawbacks.

In the methods a and b an alkyl halide has to be prepared from a corresponding carboxylic acid, which is rather a laborious process; the preparation of an acid halide from the acid is much simpler.

In the methods c, d, and e the same drawback applies as for a and b. Since in these cases the condensation moreover takes place via a metal compound, the latter can contain no substituent the presence of which makes the preparation of the said metal compound impossible. Furthermore considerable precautions are required in operating on a large scale.

In method f finally the difficulty of access of the compound to be oxidized is a considerable drawback.

In the methods for the lengthening of the chain of acid halides to form ε-ketonic acids, as mentioned in the literature (Chem. Rev. 57, 209–14 (1957) and Dutch patent application No. 188,921 (1954)), it is stated that the process may start from a substituted malonic or acylacetic ester with the general formula:

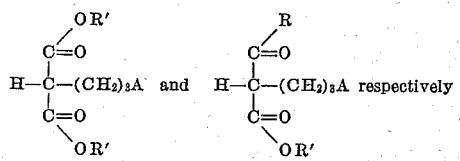

in which R stands for an alkyl radical, R' for an alkyl or aryl radical, and A for a group which after saponification may be converted into a carboxyl group.

Acylation with an acid halide, preferably an acid chloride followed by saponification and decarboxylation, and splitting off of the smallest acyl group respectively, is said to give the desired ε-ketonic acid. However, it is rather curious that no actual example for the preparation of a ε-ketonic acid is to be found in the literature.

In Chem. Listy 49, 1940-3 (1955) a method is described according to which ε-ketonic acids are prepared by the condensation of acid chlorides with 2-ketocyclopentane carboxylic ethyl ester. To this end the bromomagnesium compound of 2-ketocyclopentane carboxylic ethyl ester is prepared, which is subsequently acylated with the acid chloride in question. Although the 2-ketocyclopentane carboxylic ethyl ester is much more easily accessible than a substituted malonic or acetylacetic ester, the preparation of and the manipulation with the Grignard compound give rise to difficulties when the process is carried out on a large scale.

Now it was surprisingly found that instead of the Grignard compound an alkali derivative of a 2-ketocyclopentane carboxylic ester can be acylated with an acid halide in a strikingly simple way.

Accordingly ε-ketonic acids are prepared according to the invention in such a way that an adipic dialkyl ester, after Dieckmann condensation with the aid of an alkali metal, is reacted with an acid halide having the formula RCOX, in which R represents an aliphatic substituted or non-substituted branched or non-branched radical and X a halogen atom, followed by saponification, opening of the ring, decarboxylation, and acidification.

The process according to the invention is as follows: Substituted or non-substituted branched or non-branched carboxylic acids are condensed via the corresponding acid halides in an inert solvent, preferably toluene, with an adipic dialkyl ester, after the latter has been converted through Dieckmann condensation with the aid of an alkali metal, preferably sodium or potassium, into the alkali compounds with a 2-keto-cyclopentane carboxylic ester. After the conventional saponification, opening of the ring, and decarboxylation, followed by acidification, the ε-ketonic acid is obtained. This method results in a lengthening of the chain by five carbon atoms.

The process according to the invention thus avoids the preparation of and the manipulation with the Grignard compound, in consequence of which the dangerous reaction medium ether is avoided at the same time. Furthermore it has to be considered very striking that the 2-ketocyclopentane carboxylic ester need not be prepared separately. In fact, the process may start from an adipic dialkyl ester, which after Dieckmann condensation is reacted directly with the acid halide in question. The process is carried out in an inert solvent and the alcohol thus formed is preferably distilled off simultaneously, upon which the acid halide is added to the reaction mixture. In this way the desired ε-ketonic acid is obtained from the acid halide and the adipic dialkyl ester in one continuous series of operations. From the technical point of view therefore this amounts to an incredibly simple method of carrying out the process in question.

The two alkyl radicals of the adipic ester may be branched or non-branched saturated hydrocarbon radicals.

The acid halide preferably used is the chloride or the bromide.

The process according to the invention presents the possibility of greatly simplifying the synthesis of e.g. many macrocyclic compounds applied as scenting agents. Indeed, to this end the acid halide is so chosen that it contains a preferably terminal reactive substituent, which may or may not be protected, e.g. a protected hydroxyl group, a protected carboxyl group, a halogen atom, a double bond. Thus pentadecanolide, for example, may be prepared by starting from 10-acetoxydecanoyl chloride, upon which the 15-hydroxy 6-ketopentadecanoic acid obtained by the above method is reduced according to Wolff-Kishner and then lactonized. In a similar way hexadecanolide may be prepared from 11-bromo-undecanoyl chloride. Undecen-10-oyl chloride yields 6-ketohexadecenic-15-acid. Furthermore cyclopentadecanone, for example, may be prepared by starting from 9-ethoxycarbonyl nonanoyl chloride. In this case the last steps are an acyloine ring closure with subsequent reduction.

EXAMPLE I

*Preparation of 6-ketohexadecenic-15-acid*

To a suspension of 25 g. (1 mole) of finely divided sodium in 1000 g. of toluene, 2 g. of absolute ethanol and 202 g. (1 mole) of adipic diethyl ester are successively added in drops. The mixture is then boiled with vigorous stirring, a gradual Dieckmann condensation taking place and the ethanol thus formed being distilled off azeotropically.

When the reaction is complete after about 3 hours, at 0° C. 223 g. (1.1 moles) of undecen-10-oyl chloride is added in drops and the reaction mixture is stirred for 4 hours, the temperature being gradually raised to 50° C. during the first two hours. The reaction mixture is subsequently poured out into 500 ml. of ice-water, the toluene layer is separated off, and the latter is evaporated under reduced pressure. The residue is now boiled for 14 hours with a solution of 127 g. (1.2 moles) of sodium carbonate in 1500 g. of water. After being cooled, the mixture is acidified, Congo red being used as indicator, and the crude acid is recrystallized from petroleum ether. The product obtained is 171 g. of 6-ketohexadecenic-15-acid with melting point 68–69° C. Yield 64% of the theory, referred to the reacted adipic diethyl ester.

From the mother liquor it is possible to recover through distillation 72 g. (0.39 mole) of undecenic acid, from which with the aid of thionyl chloride the corresponding acid chloride can be prepared again in a yield of 91% of the theory. In consequence, the yields of ε-ketonic acid, referred to the acid chloride, becomes 86% of the theory.

EXAMPLE II

*Preparation of 6-ketononanoic acid*

In accordance with Example I, 39 g. (1 mole) of potassium is reacted with 202 g. (1 mole) of adipic diethyl ester, and the potassium salt of 2-ketocyclopentane carboxylic ethyl ester thus formed is condensed with 117 g. (1.1 moles) of butyric chloride. The reaction product is worked up again in accordance with Example I and subsequently boiled for 12 hours with a solution of 166 g. (1.2 moles) of potassium carbonate in 1000 g. of water. After being cooled and acidified, the crude acid is distilled and the product thus obtained is 75 g. of 6-ketononanoic acid with boiling point 150–153° C. at 4 mm. mercury pressure and melting point 37–38° C. Yield 44% of the theory.

EXAMPLE III

*Preparation of 8-methyl 6-ketononanoic acid*

In accordance with Example I, from 11.5 g. (0.5 mole) of sodium and 101 g. (0.5 mole) of adipic diethyl ester the β-ketonic ester is prepared and the latter is subsequently condensed with 91 g. (0.55 mole) of isovaleric bromide. After being worked up according to the above-mentioned process, the crude condensation product is boiled for 12 hours with a solution of 64 g. (0.6 mole) of sodium carbonate in 500 g. of water. Through acidification there is obtained: 87 g. of 8-methyl 6-ketononanoic acid with boiling point 164–166° C. at 6 mm. mercury pressure and melting point 39–40° C. Yield 47% of the theory.

EXAMPLE IV

*Preparation of 6-ketotricosanoic acid*

In accordance with Example I, 23 g. (1 mole) of sodium is reacted with 202 g. (1 mole) of adipic diethyl ester, and the reaction product is condensed with 313 g. (1.1 moles) of stearoyl chloride. After the conventional working-up the condensation product is boiled for 14 hours with a solution of 159 g. (1.5 moles) of sodium carbonate in 1500 g. of water. Cooling, acidification, and recrystallization of the crude acid from petroleum ether yields: 238 g. of 6-ketotricosanoic acid with melting point 101–102° C. Yield 65% of the theory.

EXAMPLE V

*Preparation of 15-hydroxy 6-ketopentadecanoic acid*

In accordance with Example I, 11.5 g. (0.5 mole) of sodium is reacted with 101 g. (0.5 mole) of adipic diethyl ester and the reaction product is condensed with 127 g. (0.51 mole) of 10-acetoxydecanoyl chloride. The condensation product thus formed is worked up and subsequently boiled for 16 hours with a solution of 90 g. (1.6 moles) of potassium hydroxide in a mixture of 600 g. of water and 300 g. of methanol.

After being cooled, the mixture is diluted with 400 g. of water and acidified, and the crude mixture of 15-hydroxy 6-ketopentadecanoic acid and 10-hydroxydecanoic acid thus obtained is separated. This gives: 82 g. of 15-hydroxy 6-ketopentadecanoic acid with melting point 87–88° C. Yield 60% of the theory. A quantity of 26 g. (0.14 mole) of 10-hydroxydecanoic acid may be recovered.

EXAMPLE VI

*Preparation of 16-hydroxy 6-ketohexadecanoic acid*

In accordance with Example I, the sodium compound of 2-ketocyclopentane carboxylic ethyl ester prepared from 11.5 g. (0.5 mole) of sodium and 101 g. (0.5 mole) of adipic diethyl ester is condensed with 145 g. (0.51 mole) of 11-bromo-undecanoyl chloride. After being worked up, the condensation product is boiled for 16 hours with a solution of 64 g. (1.6 moles) of sodium hydroxide in 1000 g. of water. The clear solution is cooled and acidified, Congo red being used as indicator, upon which the crude mixture of 16-hydroxy 6-ketohexadecanoic acid and 11-hydroxy undecanoic acid thus obtained is separated. In this way the product obtained is: 76 g. of 16-hydroxy 6-ketohexadecanoic acid with melting point 91–92° C. Yield 53% of the theory. In addition 22 g. (0.11 mole) of 11-hydroxy undecanoic acid may be recovered.

EXAMPLE VII

*Preparation of 5-ketotetradecane-dicarboxylic acid-1.14*

In accordance with Example I, 7.8 g. (0.2 mole) of potassium is reacted with 40.4 g. (0.2 mole) of adipic diethyl ester, and the cyclic ketonic ester thus formed is condensed with 50 g. (0.2 mole) of 9-ethoxycarbonyl-nonanoyl chloride. Working-up and boiling for 16 hours with a solution of 28 g. (0.7 mole) of sodium hydroxide in a mixture of 300 g. of water and 100 g. of ethanol yields, after acidification, a mixture of 5-ketotetradecane-dicarboxylic acid-1.14 and sebacic acid. From this mixture there is obtained, after separation: 27 g. of 5-keto-tetradecane-dicarboxylic acid-1.14 with melting point 108–109° C. Yield 48% of the theory.

A quantity of 14 g. (0.07 mole) of sebacic acid may be recovered.

What we claim is:

1. A process for the preparation of $\epsilon$-ketonic acids comprising reacting an alkali metal derivative of a 2-keto-cyclopentane-carboxylic lower alkyl ester with an acid halide having the formula RCOX in which R is an alkyl radical selected from the group consisting of branched and non-branched alkyl radicals having at most 17 carbon atoms and in which X is a halogen atom, subjecting the reaction mixture to boiling with a basic solution selected from the group of alcoholic and aqueous basic solutions, and then acidification.

2. A process according to claim 1 in which the alkyl radical represented by R is further selected from the group consisting of an alkyl radical containing an olefinic bond, an alkyl radical containing a halogen atom, an alkyl radical containing an ester group, and an alkyl radical containing a protected hydroxyl group.

3. A process for the production of $\epsilon$-ketonic acids, which comprises converting a lower dialkyl ester of adipic acid by Dieckmann condensation with the aid of an alkali metal into the alkali metal derivative of a 2-keto-cyclopentane carboxylic alkyl ester, reacting the said metal derivative with an acid halide having the formula RCOX in which R is an alkyl radical selected from the group consisting of branched and non-branched alkyl radicals having at most 17 carbon atoms and in which X is a halogen atom, subjecting the reaction mixture to boiling with a basic solution selected from the group of alcoholic and aqueous basic solutions, and then acidification.

4. A process according to claim 3 in which the alkyl radical represented by R is further selected from the group consisting of an alkyl radical containing an olefinic bond, an alkyl radical containing a halogen atom, an alkyl radical containing an ester group, and an alkyl radical containing a protected hydroxyl group.

5. A process according to claim 3, in which in one reaction vessel the adipic dialkyl ester is subjected, in an inert solvent, to the Dieckmann condensation with the aid of its alkali metal, the alcohol formed being distilled off simultaneously, and the acid halide is subsequently added to the reaction mixture.

6. A process according to claim 3, in which the lower dialkyl ester of adipic acid is the diethyl ester.

7. A process according to claim 3, in which the alkali metal is sodium.

8. A process according to claim 3, in which the alkali metal is potassium.

9. A process according to claim 3, in which the acid halide is an acid chloride.

10. A process according to claim 3, in which the acid halide is an acid bromide.

11. A process according to claim 3, in which the acid halide is stearoyl chloride.

12. A process according to claim 3, in which the acid halide is undecen-10-oyl chloride.

13. A process according to claim 3, in which the acid halide is 11-bromo-undecanoyl chloride.

14. A process according to claim 3, in which the acid halide is 9-ethoxycarbonyl-nonanoyl chloride.

15. A process according to claim 3, in which the acid halide is 10-acetoxy-decanoyl chloride.

16. A process according to claim 3, in which the acid halide is valereanoyl bromide.

17. A process for the preparation of a $\epsilon$-ketonic acid comprising reacting adipic diethyl ester with an alkali metal selected from the group consisting of sodium and potassium to effect a Dieckmann condensation, condensing the reaction product with an acid halide selected from the group consisting of butyric chloride, isovaleric bromide, stearoyl chloride, undecen-10-oyl chloride, 10-acetoxy-decanoyl chloride, 11-bromo-undecanoyl chloride, and 9-ethoxycarbonyl chloride, subjecting the reaction product to boiling with a basic solution selected from the group of alcoholic and aqueous basic solutions, and then acidification.

No references cited.